United States Patent
Sun

(10) Patent No.: US 10,514,848 B2
(45) Date of Patent: Dec. 24, 2019

(54) DATA STORAGE METHOD FOR SELECTIVELY STORING DATA IN A BUFFER PRESET IN A MEMORY OF AN ELECTRONIC DEVICE OR AN INHERENT BUFFER IN AN SSD

(71) Applicants: Beijing Lenovo Software Ltd., Beijing (CN); Lenovo (Beijing) Co., Ltd., Beijing (CN)

(72) Inventor: Qingtao Sun, Beijing (CN)

(73) Assignees: Beijing Lenovo Software Ltd., Beijing (CN); Lenovo (Beijing) Co., Ltd., Beijing (CN)

(*) Notice: Subject to any disclaimer, the term of this patent is extended or adjusted under 35 U.S.C. 154(b) by 143 days.

(21) Appl. No.: 14/974,885

(22) Filed: Dec. 18, 2015

(65) Prior Publication Data
US 2017/0090755 A1    Mar. 30, 2017

(30) Foreign Application Priority Data

Sep. 28, 2015 (CN) ............ 2015 1 0627623
Sep. 29, 2015 (CN) ............ 2015 1 0631699

(51) Int. Cl.
G06F 3/06       (2006.01)
G06F 12/08      (2016.01)
G06F 12/0866    (2016.01)

(52) U.S. Cl.
CPC .......... G06F 3/061 (2013.01); G06F 3/065 (2013.01); G06F 3/068 (2013.01); G06F 3/0619 (2013.01);
(Continued)

(58) Field of Classification Search
CPC ........ G06F 3/061; G06F 3/0619; G06F 3/065; G06F 3/0656; G06F 3/068; G06F 12/0866; G06F 2212/217
See application file for complete search history.

(56) References Cited

U.S. PATENT DOCUMENTS

2012/0284587 A1* 11/2012 Yu .............. G06F 3/0608
                                              714/773
2015/0026368 A1    1/2015 Kagan et al.
(Continued)

FOREIGN PATENT DOCUMENTS

CN         104461935 A     3/2015

OTHER PUBLICATIONS

Second German Office Action regarding Application No. 102016101311.0 dated Oct. 21, 2016. English translation provided by the German Patent & Trademark Office.
(Continued)

*Primary Examiner* — Glenn Gossage
(74) *Attorney, Agent, or Firm* — Harness, Dickey & Pierce, P.L.C.

(57) ABSTRACT

A data storage method and a solid state disk (SSD) are provided. The method comprises: obtaining, by the SSD, target data; determining a target buffer for storing the target data between a first buffer and a second buffer based on a data type of the target data, wherein the first buffer is a buffer preset in a memory of an electronic device which includes the SSD, and the second buffer is an inherent buffer in the SSD; and caching the target data into the target buffer. The method further includes: obtaining state information of the electronic device, wherein the state information indicates a current status of the electronic device, and includes a utilization rate of a central processing unit of the electronic device; determining whether a status of the electronic device has changed, based on the state information, to obtain a determination result; and transferring first data from the second buffer to a specified region in a storage medium of the SSD, or from the specified region in the storage medium to the second buffer, according to the determination result, wherein the storage medium is a flash memory in the SSD.

11 Claims, 7 Drawing Sheets

(52) U.S. Cl.
CPC ........ *G06F 3/0656* (2013.01); *G06F 12/0866* (2013.01); *G06F 2212/217* (2013.01)

(56) References Cited

U.S. PATENT DOCUMENTS

| | | | | |
|---|---|---|---|---|
| 2015/0074340 A1* | 3/2015 | Criswell | ............. | G06F 12/0868 711/103 |
| 2015/0193144 A1* | 7/2015 | Bilas | ........................ | G06F 3/064 711/103 |
| 2015/0356020 A1* | 12/2015 | Desai | .................. | G06F 12/0868 711/103 |
| 2016/0026406 A1* | 1/2016 | Hahn | .................... | G06F 3/0631 711/103 |
| 2016/0034190 A1* | 2/2016 | Lin | ........................ | G06F 3/061 711/103 |

OTHER PUBLICATIONS

First German Office Action regarding Application No. 102016101311.0 dated Apr. 21, 2016. English translation provided by the German Patent & Trademark Office.

* cited by examiner

DATA STORAGE METHOD FOR SELECTIVELY STORING DATA IN A BUFFER PRESET IN A MEMORY OF AN ELECTRONIC DEVICE OR AN INHERENT BUFFER IN AN SSD

The present application claims priority to Chinese Patent disclosure No. 201510627632.6, entitled "DATA STORAGE METHOD, DATA STORAGE APPARATUS AND SOLID STATE DISK", filed on Sep. 28, 2015 with State Intellectual Property Office of People's Republic of China, which is incorporated herein by reference in its entirety.

The present application also claims priority to Chinese Patent disclosure No. 201510631699.6, entitled as "DATA STORAGE METHOD AND STORAGE DEVICE", filed on Sep. 29, 2015 with State Intellectual Property Office of People's Republic of China, which is incorporated herein by reference in its entirety.

TECHNICAL FIELD

The disclosure relates to the field of electronic information technologies, and in particular, to a data storage method, a data storage apparatus and a solid state disk.

BACKGROUND

Solid State Disk (SSD) is widely applied to or used in electronic devices such as a laptop computer and a desktop computer, since the SSD has characteristics of a fast speed in reading and writing, and low power consumption.

The conventional SSD may include a controller, a flash memory and a buffer, the memory of the SSD may be used to cache data and store mapping tables used in algorithms. The overall performance and life of the SSD may be improved by using the buffer of the SSD to cache data. However, the capacity of the buffer of the SSD is limited and small generally, which cannot meet storage requirements of the SSD, thereby affecting the hit rate of accessing data.

SUMMARY

In view of the above, a data storage method, a data storage apparatus and a solid state disk are provided according to the disclosure, so as to improve the storage performance of the SSD.

In order to achieve the above object, the disclosure provides technical solutions as follows.

In one aspect, a data storage method applied to or used in a solid state disk (SSD) is provided, which includes:
  obtaining target data to be written;
  determining a target buffer for storing the target data between a first buffer and a second buffer, wherein the first buffer is a buffer preset in a memory in an electronic device coupled to the SSD, and the second buffer is an inherent buffer in the SSD;
  caching the target data into the target buffer,
  obtaining state information of the electronic device, wherein the state information indicates a current status of the electronic device and includes a utilization rate of a central processing unit (CPU) of the electronic device;
  determining, based on the state information of the electronic device, whether a status of the electronic device has changed, to obtain a determination result; and
  transferring first data from the second buffer to a specified region in a storage medium of the SSD, or from the specified region in the storage medium to the second buffer, according to the determination result, wherein the storage medium is a flash memory in the SSD,
  wherein a speed of reading data in the specified region in the storage medium is higher than a speed of reading data in the other storage regions, and a service life of the specified region in the storage medium is longer than a service life of the other storage regions.

In a second aspect, a solid state disk is further provided according to the disclosure, which includes:
  a controller; a second buffer; and a storage medium,
  wherein the controller is configured to:
  obtain target data to be written;
  determine a target buffer for storing the target data between a first buffer and the second buffer, wherein the first buffer is a buffer preset in a memory in an electronic device coupled to the solid state disk, and the second buffer is a memory in the solid state disk;
  cache the target data into the target buffer;
  obtain state information of the electronic device, wherein the state information indicates a current status of the electronic device and includes a utilization rate of a central processing unit (CPU) of the electronic device;
  determine, based on the state information of the electronic device, whether a status of the electronic device has changed, to obtain a determination result; and
  transfer first data from the second buffer to a specified region in the storage medium of the solid state disk, or from the specified region in the storage medium to the second buffer, according to the determination result, wherein the storage medium is a flash memory in the SSD,
  wherein a speed of reading data in the specified region in the storage medium is higher than a speed of reading data in the other storage regions, and a service life of the specified region in the storage medium is longer than a service life of the other storage regions.

From the above-described technical solutions, in a case that it is determined that the obtained target data to be written is data to be cached, a target buffer is determined between a first buffer and a second buffer, and the target data is cached into the target buffer. The first buffer is a buffer preset in a memory in an electronic device and the second buffer is an inherent buffer in an SSD. Therefore, the target data may be stored into the buffer preset in the memory in the electronic device or the inherent buffer in the SSD as needed, buffer space of the SSD for storing data to be cached is expanded with the buffer in the memory in the electronic device, and available buffer space of the SSD is increased, which improves the storage performance of the SSD.

BRIEF DESCRIPTION OF THE DRAWINGS

In order to illustrate the technical solutions according to the embodiments of the disclosure more clearly, the drawings to be used in the description of the embodiments are described briefly hereinafter. As should be apparent, the drawings described hereinafter are only for some embodiments of the present disclosure, and other drawings may be obtained by those skilled in the art according to those drawings without creative effort.

DETAILED DESCRIPTION OF THE EMBODIMENTS

A data storage method and a data storage apparatus are provided according to embodiments of the disclosure, so as to use a part of memory in an electronic device as a buffer of an SSD, to expand the buffer space of the SSD and improve the storage performance of the SSD. In some embodiments, the electronic device may be a host.

Hereinafter, the technical solutions in embodiments of the disclosure are described clearly and completely in conjunction with the drawings of the embodiments of the disclosure. It will be apparent that the described embodiments are only some embodiments of the present disclosure. Other embodiments obtained by those skilled in the art on the basis of the embodiments of the present disclosure without creative work fall into the scope of protection of the present disclosure.

First, a data storage method according to the disclosure is introduced.

Figure 1:
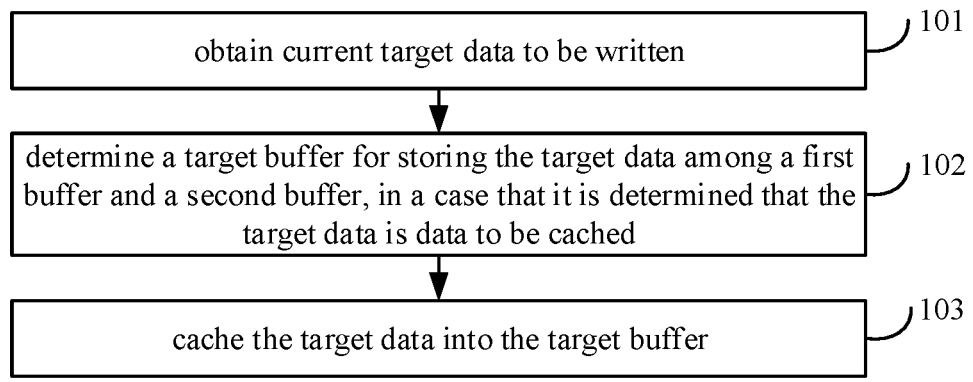
FIG. 1 illustrates a schematic flowchart of a data storage method including determining a target buffer according to an embodiment of the disclosure.

Reference is made to FIG. 1, which illustrates a schematic flowchart of a data storage method according to an embodiment of the disclosure. The method according to the embodiment may be applied to or used with an SSD, and may include steps 101 to 103.

In step 101, target data to be written is obtained.

The process of SSD obtaining the target data to be written may be similar to that in the conventional technology, for example, the SSD obtains the target data to be written, which is transmitted by a processor.

In step 102, a target buffer for storing the target data is determined between a first buffer and a second buffer, in a case that it is determined that the target data is data to be cached.

The first buffer is a buffer preset in a memory in an electronic device and the second buffer is an inherent buffer in the SSD.

Compared with the conventional technology, in this embodiment of the disclosure, the buffer space which can be operated or accessed by the SSD actually includes two buffers. One buffer is the inherent buffer in the SSD, that is, the buffer used by data currently cached in the SSD, which is inside the SSD; the other buffer is the buffer preset in the memory in the electronic device, which is a part of the memory in the electronic device. In order to facilitate distinguishing, the buffer preset in the memory in the electronic device which can be accessed by the SSD is referred to as the first buffer, and the inherent buffer in the SSD is referred to as the second buffer in embodiments of the disclosure.

In this embodiment of the disclosure, a part of the buffer in the memory in the electronic device is expanded to be the buffer available for the SSD, thereby improving the cache performance of the SSD.

In practice, after the target data to be cached is obtained by the SSD, a buffer for currently storing the target data is determined between the first buffer and the second buffer, so as to cache the target data into the determined buffer. In order to facilitate distinguishing, the buffer for storing the target data between the first buffer and the second buffer is referred to as a target buffer.

It can be understood that, after the target data is obtained, it is determined whether the target data is to be cached, which may be similar to the conventional technology. The way of storing the target data may be different according to different access frequencies of the target data or different uses of the target data. For example, the data necessary for a processor may be cached, and some data used infrequently may not be cached.

In step 103, the target data is cached into the target buffer.

In this embodiment of the disclosure, in a case that it is determined that the obtained target data to be written is data to be cached, a target buffer is determined between a first buffer and a second buffer, and the target data is cached into the target buffer. The first buffer is the buffer preset in the memory in the electronic device and the second buffer is the inherent buffer in the SSD. Therefore, the target data may be stored into the buffer preset in the memory in the electronic device or the inherent buffer in the SSD as needed, buffer space of the SSD for storing data to be cached is expanded with the buffer in the memory in the electronic device, and available buffer space of the SSD is increased, which improves the storage performance of the SSD.

It should be noted that, in any one of the embodiments of the disclosure, the buffer preset in the memory in the electronic device may be considered to be space reserved in the memory in the electronic device which can be accessed by the SSD, and the reserved space cannot act as the memory for the electronic device. In a process of starting the electronic device, a BIOS program in the electronic device reports a specified area in the memory to the electronic device, and the specified area does not include the preset buffer. After the electronic device is started, only the specified area in the memory may be used by the electronic device, and the preset buffer in the memory may not be used by the electronic device.

It can be understood that, a number of ways may be used to determine a target buffer for storing the target data between the first buffer and the second buffer.

In a possible implementation way, the SSD may determine the target buffer randomly.

In another possible implementation way, the SSD may determine the target buffer for storing the target data, based on the remaining available buffer space in the first buffer and the second buffer. Based on a principle of load balance, the buffer with a larger remaining available buffer space is selected between the first buffer and the second buffer to be the target buffer.

As a matter of course, other ways of determining a target buffer may be used, which may also be applied to the disclosure.

Figure 2:
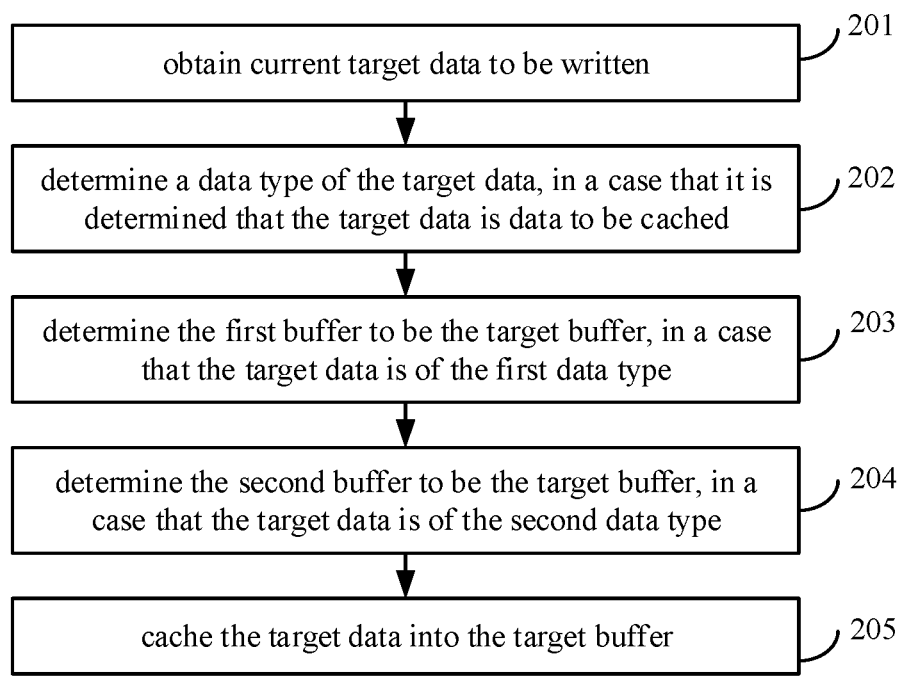
FIG. 2 illustrates a schematic flowchart of a data storage method including determining a data type according to an embodiment of the disclosure.

A way of determining a target buffer is introduced in detail below. Reference is made to FIG. 2, which illustrates a schematic flowchart of a data storage method according to an embodiment of the disclosure. The method according to the embodiment may be applied to or used with an SSD, and may include steps 201 to 205.

In step 201, target data to be written is obtained.

In step 202, a data type of the target data is determined, in a case that it is determined that the target data is data to be cached.

The data type may indicate a frequency of data being accessed, and the data type includes a first data type and a second data type. An estimated access frequency of the data of the first data type is higher than that of the data of the second data type.

In the SSD, some data is read frequently, and some data may be read infrequently. If the speed of reading the data accessed frequently is too slow, the data processing performance of an electronic device may be affected. Hence, in this embodiment of the disclosure, the target data to be stored is classified to determine a target buffer for storing the target data, based on the data type of the target data.

In step 203, the first buffer is determined to be the target buffer, in a case that the target data is of the first data type.

In step 204, the second buffer is determined to be the target buffer, in a case that the target data is of the second data type.

The first buffer is a buffer preset in a memory in an electronic device and the second buffer is an inherent buffer in the SSD.

It can be understood that, a data reading/writing performance of the buffer in the memory in the electronic device is higher than a data reading/writing performance of the inherent buffer in the SSD. Therefore, if the target data is data with a higher access frequency, the target data needs a higher data reading/writing performance. In this case, the target data may be stored into the first buffer. The target data of other data types may be stored directly into the second buffer of the SSD.

In this embodiment of the disclosure, the data type of the target data may be determined based on the stored records of data access frequency and the access frequency of the data of a preset data type; or the data types of different data may also be preset.

In step 205, the target data is cached into the target buffer.

After the target buffer is determined, the data may be directly stored into the target buffer.

Optionally, since the reading/writing performance of the first buffer is higher than that of the second buffer, the target data may be written into the first buffer in a first data writing speed, in a case that the target data is of the first data type; or the target data may be written into the second buffer in a second data writing speed, in a case that the target data is of the second data type. The first data writing speed is faster than the second data writing speed.

Optionally, on the basis of the embodiment shown in FIG. 2, after the target data is cached into the target buffer, the data storage method may further include: counting an access frequency of the target data; and updating the data type of the target data, in a case that it is determined, based on the access frequency of the target data, that the data type of the target data changes.

After the target data is stored, the access frequency of the target data is counted to determine the change of the data type of the target data, which facilitates accurately determining the data type of the data to be stored, and reasonably determining a buffer for storing the target data between the first buffer and the second buffer.

Further, the data storage method further includes: after it is determined, based on the access frequency of the target data, that the data type of the target data changes, transferring the target data into a buffer corresponding to a current target data type, based on the target data type of the target data.

The target buffer for storing the target data may be adjusted dynamically, based on the change of the data type of the target data. The buffer preset in the memory in the electronic device and the inherent buffer in the SSD may be used dynamically, thereby more reasonably allocating the memory inside the SSD and the memory in the electronic device.

It can be understood that, in any one of the above embodiments, a direct memory access (DMA) operation in the electronic device may be performed to transfer data without an interface module of the electronic device, and thus the target data is stored into the first buffer.

The interface of the electronic device module may be used to store the target data into the second buffer.

Figure 3:
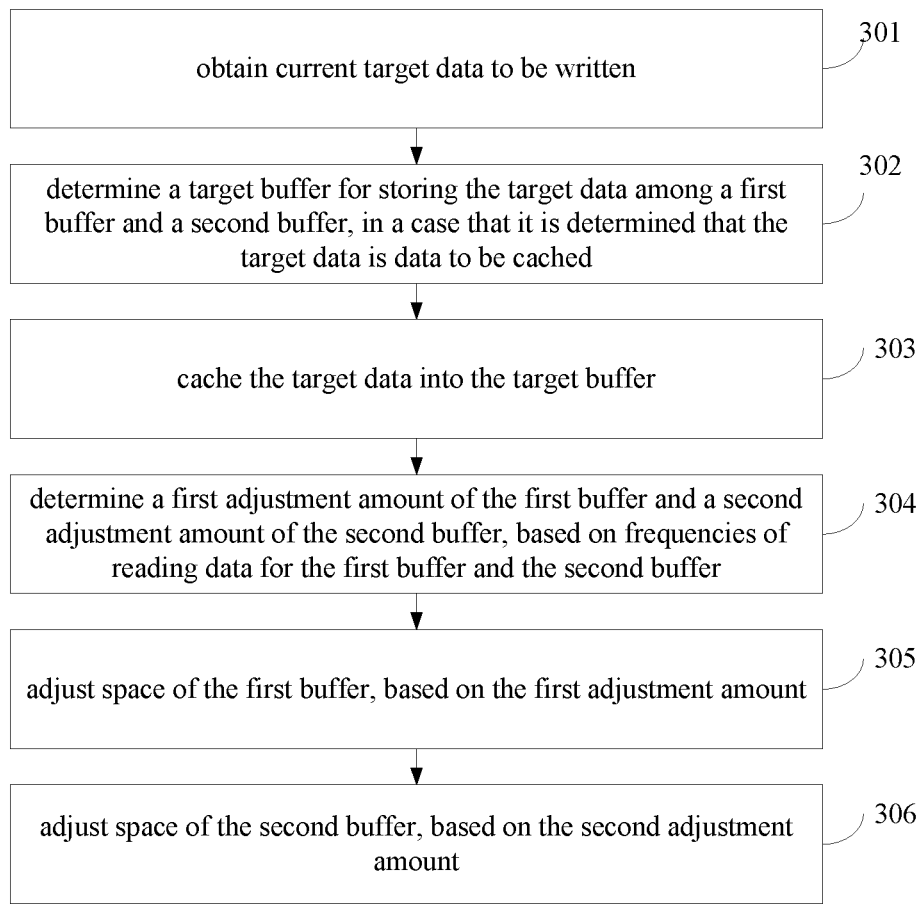
FIG. 3 illustrates a schematic flowchart of a data storage method including determining adjustment amounts of first and second buffers according to an embodiment of the disclosure.

Reference is made to FIG. 3, which illustrates a schematic flowchart of a data storage method according to an embodiment of the disclosure. The method according to the embodiment may be applied to or used with an SSD, and may include steps 301 to 306.

In step 301, target data to be written is obtained.

In step 302, a target buffer for storing the target data is determined between a first buffer and a second buffer, in a case that it is determined that the target data is data to be cached.

The first buffer is a buffer preset in a memory in an electronic device and the second buffer is an inherent buffer in the SSD.

In step 303, the target data is cached into the target buffer.

For the above steps 301 to 303, the related descriptions in any one of the above embodiments may be referred to, which are not repeated herein.

In step 304, a first adjustment amount of the first buffer and a second adjustment amount of the second buffer are determined, based on frequencies of reading data for the first buffer and the second buffer.

In this embodiment of the disclosure, it is determined whether the current storage space in the first buffer meets the storage need in the first buffer, based on the frequency of reading data in the first buffer. If the frequency of reading data in the first buffer is high, the access frequency of the first buffer is high, and a large amount of data being accessed frequently is stored in the first buffer. In order to meet the needs of data reading, the capacity of the first buffer may be increased properly, and the first adjustment amount may be a storage space to be increased for the first buffer. Accordingly, if the frequency of reading data in the first buffer is low, the storage space of the first buffer may be reduced properly.

Similarly, for the second buffer, it is determined whether to increase or reduce the capacity of the second buffer, based on the frequency of reading data in the second buffer.

In step 305, space of the first buffer is adjusted, based on the first adjustment amount.

The process of adjusting the first buffer based on the first adjustment amount may include sending a request for adjusting the first adjustment amount and the buffer space of the first buffer to the electronic device, and then the BIOS program in the electronic device reallocates the capacity of the first buffer after it is detected that the electronic device is started.

In step 306, space of the second buffer is adjusted, based on the second adjustment amount.

In the adjusting of the second buffer, the capacity of the second buffer may be reallocated. For example, if the capacity of the second buffer is increased, other storage space in the SSD may be reduced accordingly; if the capacity of the second buffer is reduced, other storage space in the SSD may be increased accordingly.

According to this embodiment, the space of the first buffer and the second buffer may be adjusted dynamically, thereby meeting the requirements of data access.

Figure 4:
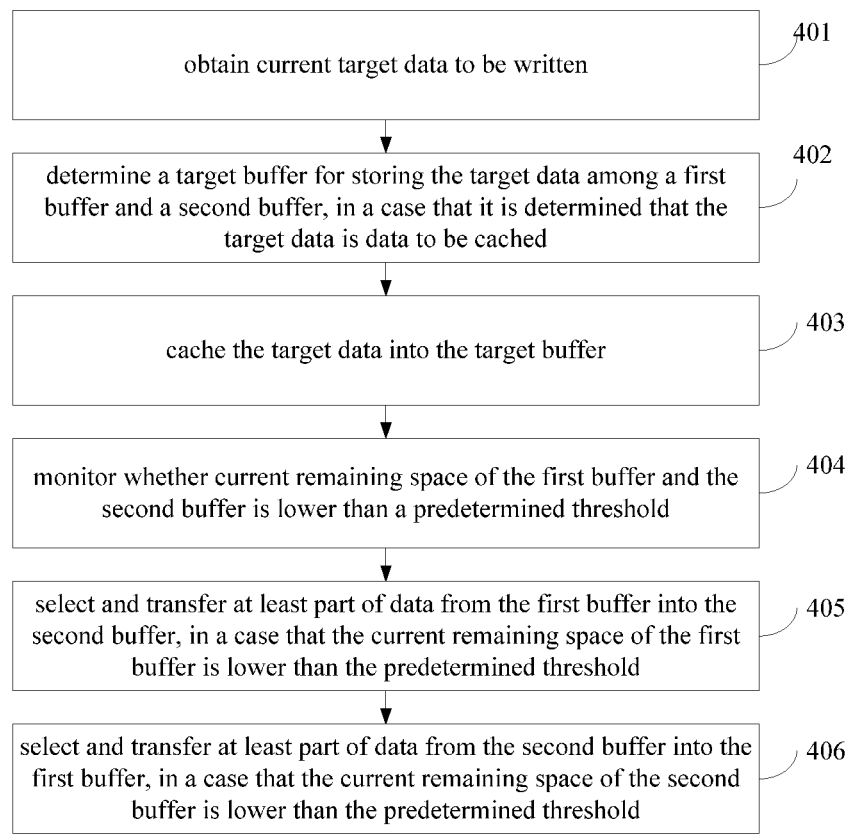
FIG. 4 illustrates a schematic flowchart of a data storage method including monitoring remaining space of first and second buffers according to an embodiment of the disclosure.

Reference is made to FIG. 4, which illustrates a schematic flowchart of a data storage method according to an embodiment of the disclosure. The method according to the embodiment may be applied to or used with an SSD, and may include steps 401 to 406.

In step 401, target data to be written is obtained.

In step 402, a target buffer for storing the target data is determined between a first buffer and a second buffer, in a case that it is determined that the target data is data to be cached.

The first buffer is a buffer preset in a memory in an electronic device and the second buffer is an inherent buffer in the SSD.

In step 403, the target data is cached into the target buffer.

For the above steps 401 to 403, the related descriptions in any one of the above embodiments may be referred to, which are not repeated herein.

In step 404, it is monitored whether current remaining space of the first buffer and the second buffer is lower than a predetermined threshold.

The predetermined threshold may be set as required, and predetermined thresholds for the first buffer and the second buffer may be the same, or may also be different.

Abnormal cases of data storage due to insufficient remaining space of the first buffer or the second buffer may be reduced through the step of monitoring.

In step 405, at least part of data is selected and transferred from the first buffer into the second buffer, in a case that the current remaining space of the first buffer is lower than the predetermined threshold.

In step 406, at least part of data is selected and transferred from the second buffer into the first buffer, in a case that the current remaining space of the second buffer is lower than the predetermined threshold.

The data stored in one of the first buffer and the second buffer may be transferred into the other of the first buffer and the second buffer, in a case that the current remaining space of the first buffer or the second buffer is lower than a predetermined threshold.

For the transferring of data in any one of the buffers, it may be determined whether the data is transferred into another buffer, based on the access frequency of the data in the buffer.

As an example, in a case of transferring the data in the first buffer into the second buffer, a current estimated access frequency of the data stored in the first buffer is determined in a case that it is detected that the remaining space of the first buffer is lower than the predetermined threshold; according to an order from highest to lowest of the estimated access frequencies of the target data stored in the storage area of the target data, the specified amount of the target data with lower estimated access frequencies is transferred into the second buffer.

As another example, in a case of transferring the data in the second buffer into the first buffer, an estimated access frequency of the data stored in the second buffer is determined in a case that it is detected that the remaining space of the second buffer is lower than the predetermined threshold; according to an order from highest to lowest of the estimated access frequencies of the target data stored in the storage area of the target data, the specified amount of the target data with higher estimated access frequencies is transferred into the first buffer.

Corresponding to the data storage method according to the disclosure, a data storage apparatus is further provided according to an embodiment of the disclosure.

Figure 5:
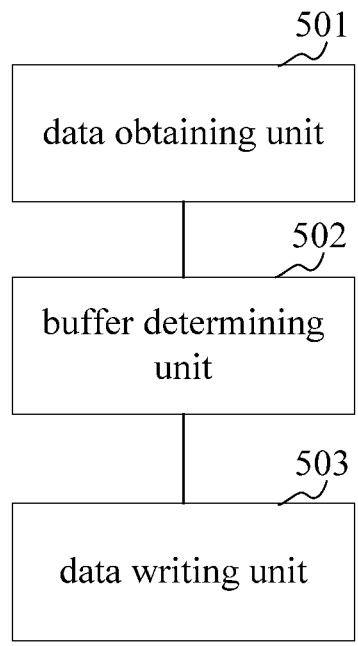
FIG. 5 is a schematic structural diagram of a data storage apparatus according to an embodiment of the disclosure.

Reference is made to FIG. 5, which illustrates a schematic structural diagram of a data storage apparatus according to an embodiment of the disclosure. The data storage apparatus according to the disclosure is applied to or used in an SSD and may include a data obtaining unit 501, a buffer determining unit 502 and a data writing unit 503.

The data obtaining unit 501 is configured to obtain target data to be written.

The buffer determining unit 502 is configured to determine a target buffer for storing the target data between a first buffer and a second buffer, in a case that it is determined that the target data is data to be cached, where the first buffer is a buffer preset in a memory in an electronic device and the second buffer is an inherent buffer in the SSD.

The data writing unit 503 is configured to cache the target data into the target buffer.

In this embodiment of the disclosure, in a case that it is determined that the obtained target data to be written is data to be cached, a target buffer is determined between a first buffer and a second buffer, and the target data is cached into the target buffer. The first buffer is a buffer preset in a memory in an electronic device and the second buffer is an inherent buffer in an SSD. Therefore, the target data may be stored into the buffer preset in the memory in the electronic device or the inherent buffer in the SSD as needed, buffer space of the SSD for storing data to be cached is expanded with the buffer in the memory in the electronic device, and available buffer space of the SSD is increased, which improves the storage performance of the SSD.

Figure 6:
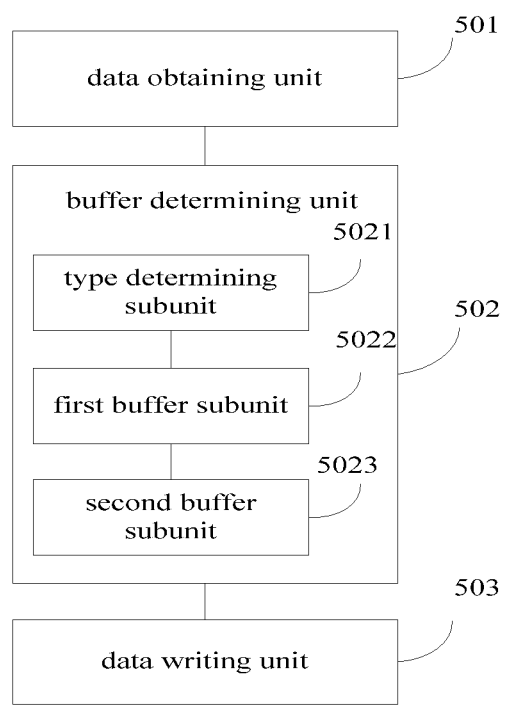
FIG. 6 is a schematic structural diagram of a data storage apparatus including a buffer determining unit according to another embodiment of the disclosure.

Reference is made to FIG. 6, which illustrates a schematic structural diagram of a data storage apparatus according to an embodiment of the disclosure. The data storage apparatus according to this embodiment of the disclosure is different from the data storage apparatus according to the above embodiment as follows.

The buffer determining unit 502 includes:

a type determining subunit 5021 configured to determine a data type of the target data, where the data type includes a first data type and a second data type, an estimated access frequency of the data of the first data type is higher than that of data of the second data type;

a first buffer subunit 5022 configured to determine the first buffer to be the target buffer, in a case that the target data is of the first data type; and a second buffer subunit 5023 configured to determine the second buffer to be the target buffer, in a case that the target data is of the second data type.

Optionally, the apparatus according to this embodiment may further include:

a frequency counting unit configured to count an access frequency of the target data, after the target data is cached by the data writing unit into the target buffer; and a type updating unit configured to update the data type of the target data, in a case that it is determined, based on the access frequency of the target data, that the data type of the target data changes.

The apparatus according to this embodiment may further include:

a data transferring unit configured to transfer the target data into a buffer corresponding to a current target data type, based on the target data type of the target data, after it is determined by the type updating unit that the data type of the target data changes.

Optionally, the apparatus according to any one of the above embodiments may include:

a space monitoring unit configured to monitor whether current remaining space of the first buffer and the second buffer is lower than a predetermined threshold;

a first transferring unit configured to select and transfer at least part of data from the first buffer into the second buffer, in a case that the current remaining space of the first buffer is lower than the predetermined threshold; and a second transferring unit configured to select and transfer at least part of data from the second buffer into the first buffer, in a case that the current remaining space of the second buffer is lower than the predetermined threshold.

Optionally, the apparatus according to any one of the above embodiments may include:

an adjustment amount determining unit configured to determine a first adjustment amount of the first buffer and a second adjustment amount of the second buffer, based on frequencies of reading data for the first buffer and the second buffer;

a first adjustment unit configured to adjust space of the first buffer, based on the first adjustment amount; and a second adjustment unit configured to adjust space of the second buffer, based on the second adjustment amount.

In a third aspect, a solid state disk is further provided according to the disclosure.

Figure 7:
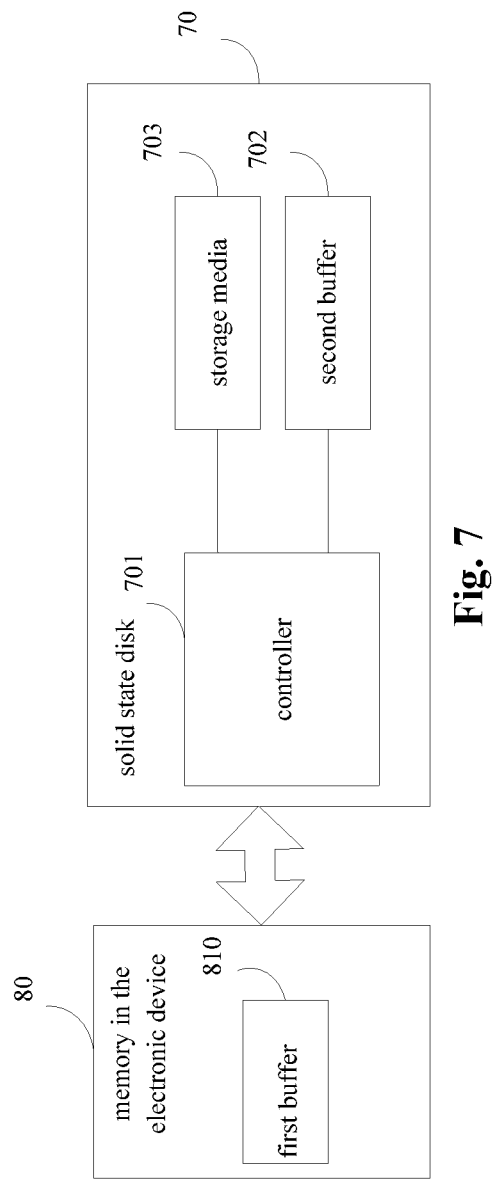
FIG. 7 is a schematic structural diagram of a solid state disk according to an embodiment of the disclosure.

Reference is made to FIG. 7, which illustrates a schematic structural diagram of a solid state disk according to an embodiment of the disclosure. The solid state disk 70 according to the embodiment may include:

a controller 701 and a second buffer 702, where the controller 701 is configured to obtain target data to be written; determine a target buffer for storing the target data between a first buffer 810 and the second buffer 702, in a case that it is determined that the target data is data to be cached; cache the target data into the target buffer, where the first buffer is a buffer preset in a memory in an electronic device.

It should be understood that, the solid state disk may include storage media 703 which may be a flash memory.

The controller of the solid state disk may be connected to the first buffer in the memory in the electronic device via an interface module of the electronic device.

Optionally, the determining, by the controller, a target buffer for storing the target data between a first buffer and the second buffer may include:

determining, by the controller, a data type of the target data, where the data type includes a first data type and a second data type, an estimated access frequency of the data of the first data type is higher than that of data of the second data type; determining, by the controller, the first buffer to be the target buffer, in a case that the target data is of the first data type; or determining, by the controller, the second buffer to be the target buffer, in a case that the target data is of the second data type.

Optionally, the controller may be further configured to count an access frequency of the target data, after the target data is cached into the target buffer; and update the data type of the target data, in a case that it is determined, based on the access frequency of the target data, that the data type of the target data changes.

The controller may be further configured to transfer the target data into a buffer corresponding to a current target data type, based on the target data type of the target data, after it is determined, based on the access frequency of the target data, that the data type of the target data changes.

Optionally, the controller may be further configured to monitor whether current remaining space of the first buffer and the second buffer is lower than a predetermined threshold; select and transfer at least part of data from the first buffer into the second buffer, in a case that the current remaining space of the first buffer is lower than the predetermined threshold; or select and transfer at least part of data from the second buffer into the first buffer, in a case that the current remaining space of the second buffer is lower than the predetermined threshold.

Optionally, the controller may be further configured to determine a first adjustment amount of the first buffer and a second adjustment amount of the second buffer, based on frequencies of reading data for the first buffer and the second buffer; adjust space of the first buffer, based on the first adjustment amount; and adjust space of the second buffer, based on the second adjustment amount.

Figure 8:
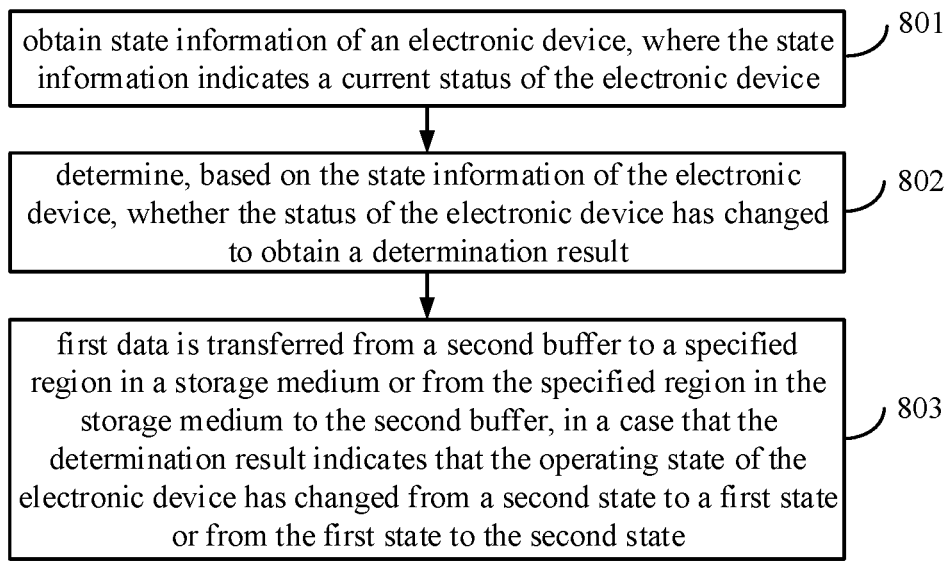
FIG. 8 is a flowchart of a data storage method including determining a change in status of an electronic device according to an embodiment of the disclosure.

Reference is made to FIG. 8, which illustrates a flowchart of a data storage method according to an embodiment of the disclosure. The data storage method may include steps 801 to 803.

In step 801, state information of an electronic device is obtained, where the state information indicates a current status of the electronic device. In this embodiment of the disclosure, the state information indicates the current status of the electronic device and at least includes, but is not limited to, power parameters of the electronic device. The power parameters indicate the current remaining amount of power of the electronic device. In a case that the remaining amount of power of the electronic device is less than a preset amount of power, the electronic device may supply less power to components, and the electronic device is in a status of low power consumption; or in a case that the remaining amount of power of the electronic device is greater than or equal to the preset amount of power, the electronic device may supply more power to components, and the electronic device is in a normal status.

In this embodiment of the disclosure, the power parameters of the electronic device may be obtained from a power management system for the electronic device. The power management system records use of the power in the electronic device, and thus the power parameters may be obtained via the power management system. The above-mentioned preset amount of power is a measurement criterion for distinguishing the electronic device being in the status of low power consumption or in the normal status. For example, the preset amount of power may be 20% of the total amount of power. The preset amount of power may be set as required, which is not limited in this embodiment of the disclosure.

Furthermore, the above-mentioned state information may include resource consumption of the electronic device, such as a utilization rate of a CPU, and the status of the electronic device is determined based on the utilization rate of the CPU. For example, in a case that the utilization rate of a CPU is in a first utilization rate range, the electronic device is in a status of low power consumption; or in a case that the utilization rate of the CPU is in a second utilization rate range, the electronic device is in a normal status. The maximum of the first utilization rate range is less than the minimum of the second utilization rate range, and the status of the electronic device may be determined based on the first utilization rate range and the second utilization rate range. In this embodiment of the disclosure, the first utilization rate range and the second utilization rate range may be set as required, which are not limited in this embodiment of the disclosure.

In step 802, it is determined, based on the state information of the electronic device, whether the status of the electronic device has changed to obtain a determination result. Since the state information of the electronic device may indicate the current status of the electronic device, it may be determined, based on the state information of the electronic device, whether the status of the electronic device has changed to obtain a determination result. For example, it may be determined, based on the state information of the electronic device, whether the status of the electronic device has changed between the status of low power consumption and the normal status.

In step 803, in a case that the determination result indicates that the status of the electronic device has changed from a second state to a first state or from the first state to the second state, first data is transferred from a second buffer to a specified region in a storage medium or from the specified region in the storage medium to the second buffer.

The power consumption of the electronic device in the first state is less than the power consumption of the electronic device in the second state, provided that the first state is the above-mentioned status of the low power consumption, and the second state is the above-mentioned normal status. The power consumption of the electronic device in the two statuses or states is different, and the power consumption of the electronic device in the status of low power consumption is less than the power consumption of the electronic device in the normal status. In a case that the determination result indicates that the status of the electronic device has changed from the first state to the second state or from a second state to a first state, one storage object is selected from the second buffer and the specified region in the storage medium to store the first data. Therefore, the first data is stored based on the status of the electronic device. The first data may be common, frequently used data in the running of the electronic device, such as startup data and mapping tables in an operating system.

In this embodiment of the disclosure, the specified region in the storage medium has different characteristics from other storage regions in the storage medium, that is, the storage medium includes the specified region and the other storage regions, and the characteristics of the specified region is different from the characteristics of the other storage regions. As an example, a service life of the specified region is longer than a service life of the other storage regions. In a case that the first data is stored in the specified region, a reading/writing operation has less effect on the specified region than the other storage regions, therefore, the service life of the storage medium is increased in comparison with the service life of the storage medium of which the first data is stored in the other storage regions. As another example, a speed of reading data in the specified region is higher than a speed of reading data in the other storage regions. In a case that the first data is stored in the specified region, the first data is read faster from the specified region, and thus the speed of reading the first data is increased.

As a matter of course, the characteristics of the specified region being different from the characteristics of the other storage regions may include: a speed of reading data in the specified region being higher than a speed of reading data in the other storage regions, and service life of the specified region being longer than service life of the other storage regions. In this case, the speed of reading the first data is increased, and the service life of the storage medium is improved. Hence, in this embodiment of the disclosure, the specified region in the storage medium to store the first data may be selected according to requirement of the first data.

From the above-described technical solutions, with the data storage method according to the embodiment of the disclosure, it may be determined, based on the state information of the electronic device, the status of the electronic device changing to obtain a determination result; and in a case that the obtained determination result indicates that the status of the electronic device changes from the second state to the first state or from the first state to the second state, first data is transferred from the second buffer to the specified region in the storage medium or from the specified region in the storage medium to the second buffer, therefore, one storage object is selected based on the status of the electronic device to store the first data.

The specified region in the storage medium has different characteristics from other storage regions in the storage medium, for example, a service life of the specified region is longer than a service life of the other storage regions. In a case that the first data is stored in the specified region, a reading/writing operation has less effect on the specified region than the other storage regions, therefore, the service life of the storage medium is increased in comparison with the service life of the storage medium of which the first data is stored in the other storage regions.

Figure 9:
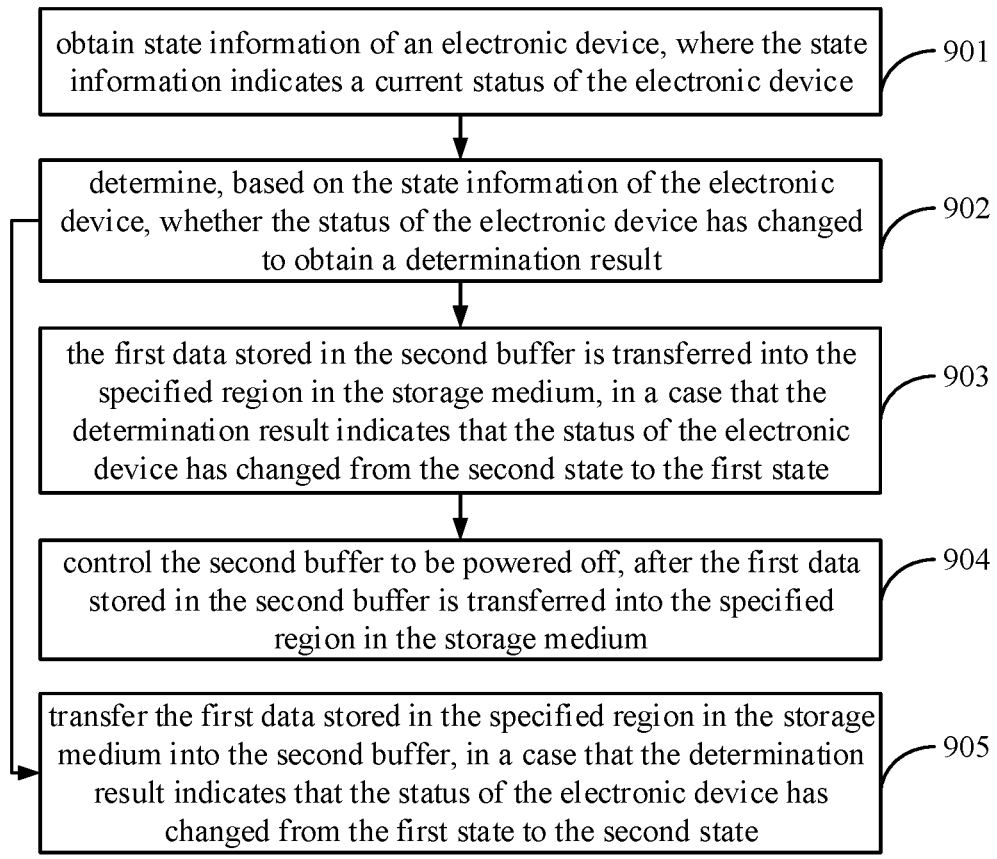
FIG. 9 is a flowchart of a data storage method including controlling powering off of a buffer according to an embodiment of the disclosure.

Reference is made to FIG. 9, which illustrates a flowchart of a data storage method according to an embodiment of the disclosure, in which a method for storing first data based on the status of the electronic device is described in detail. The data storage method may include steps 901 to 905.

In step 901, state information of an electronic device is obtained, where the state information indicates a current status of the electronic device.

In step 902, it is determined, based on the state information of the electronic device, whether the status of the electronic device has changed to obtain a determination result. In this embodiment of the disclosure, the implementations of steps 901 to 902 are the same as that of the steps 801 to 802, and are not described in detail herein.

In step 903, the first data stored in the second buffer is transferred into the specified region in the storage medium, in a case that the determination result indicates that the status of the electronic device changes from the second state to the first state.

In step 904, after the first data stored in the second buffer is transferred into the specified region in the storage medium, the second buffer is powered off.

In this embodiment of the disclosure, the power consumption of the electronic device in the first state is less than the power consumption of the electronic device in the second state. In a case that the determination result indicates that the status of the electronic device changes from the second state to the first state, it indicates that the power consumption of the electronic device may be reduced from a normal consumption to a lower consumption. Hence, in a case that the electronic device is in the first state, power consumption of the second buffer may be reduced by controlling the second buffer to be powered off, and thus the total power consumption of the electronic device may be reduced. In a case that the power consumption of the second buffer is greater than the power consumption of the storage medium, the reduced power consumption by controlling the second buffer to be powered off is greater than the reduced power consumption by controlling the storage medium to be powered off when the electronic device is in the first state.

Provided that the second buffer is used as a memory in an SSD module, and the storage medium is used as a flash memory in the SSD module, in a case that both the memory and the flash memory are charged, the power consumption of the memory is greater than the power consumption of the flash memory. Therefore, in a case that the status of the electronic device changes from the second state to the first state, the total power consumption of the electronic device may be reduced by controlling the memory to be powered off Data stored in a part of the conventional storage media may be lost after the part of the conventional storage media is powered off. Hence, in a case that the status of the electronic device changes from the second state to the first state, the first data stored in the second buffer is transferred into the specified region in the storage medium, to reduce the probability of losing the first data stored in the second buffer after the second buffer is powered off The second buffer still is used as a memory, and the memory is volatile, which means that the first data stored in the memory will be lost after the memory is powered off. Hence, in a case that the status of the electronic device changes from the second state to the first state, the first data stored in the second buffer is transferred into the specified region in the storage medium, and then the memory is powered off.

In step 905, the first data stored in the specified region in the storage medium is transferred into the second buffer, in a case that the determination result indicates that the status of the electronic device changes from the first state to the second state.

In this embodiment of the disclosure, in a case that the determination result indicates that the status of the electronic device changes from the first state to the second state, it indicates that the power consumption of the electronic device may change from a lower consumption to a normal consumption. In this case, the first data stored in the specified region in the storage medium may be transferred into the second buffer.

Figure 10:
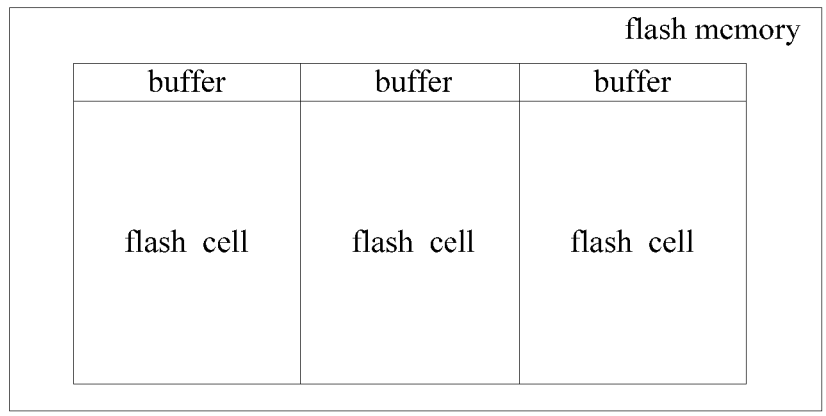
FIG. 10 is a schematic structural diagram of a flash memory according to an embodiment of the disclosure.

The data storage method according to this embodiment of the disclosure is described below by providing that the second buffer is used as a memory and the storage medium is used as a flash memory. In this embodiment of the disclosure, the schematic structural diagram of the flash memory is illustrated in FIG. 10, and the flash memory includes multiple flash cells, and each of the flash cells is associated with one buffer.

In a process of reading/writing data, the flash cells perform an erase operation, which results in reducing the service life of the flash cells, but has no effect on service life of the buffer. Hence, the service life of the buffer is longer than the service life of the flash cells.

During writing of data into the flash memory via a memory bus, the data is written into the buffer, and then the data is written into a flash cell via a circuit inside the flash memory. Accordingly, in a data reading operation, the data is read from the flash cells into the buffer, then the data is read from the buffer onto the bus, and the data is sent to the memory via the bus. For the memory, the buffer and the flash cell, an order of transmitting data from the memory to the flash memory is as follows: from the memory to the buffer and then from the buffer to the flash cell; and an order of transmitting data from the flash memory to the memory is as follows: from the flash cell to the buffer and then from the buffer to the memory. It shows that a speed of reading data in the buffer is higher than a speed of reading data in the flash cell. Hence, in this embodiment of the disclosure, the buffer may be used as a specified region, and the flash cell may be used as other storage region.

In a case that the status of the electronic device changes from the second state to the first state, the first data stored in the memory is transferred into the buffer in the flash memory. In a case that the status of the electronic device is in the first state, the power consumption of the electronic device has to be reduced. The static power consumption of the flash memory out of service is far less than the static power consumption of the memory. Therefore, the power consumption of the electronic device is reduced by controlling the memory to be powered off when the status of the electronic device is in the first state. However, the memory is volatile, and the first data stored in the memory will be lost after the memory is powered off. Therefore, in a case that the status of the electronic device is in the first state, the first data stored in the memory is transferred into the buffer in the flash memory, to avoid the data stored in the memory being lost after the memory is powered off In a case that the status of the electronic device changes from the first state to the second state, the first data stored in the buffer in the flash memory is transferred into the memory. Since the memory directly communicates with the central processing unit (CPU), a speed of reading data may be increased by transferring the first data into the memory when the status of the electronic device is in the second state.

From the above-described embodiments, in a case that the status of the electronic device changes, the first data is transferred between the memory and the buffer in the flash memory to increase the speed of reading data. Moreover, the first data is not stored in the flash cell. Therefore, a reading/writing operation for the first data has no effect on the service life of the flash cell, and the service life of the buffer is greater than the service life of the flash cell, and thus the service life of the flash memory is increased.

For sake of simplicity, the above-described embodiments are described in a combination of steps, but it is well known by those skilled in the art that the disclosure is not limited to the sequence of the described steps. According to the disclosure, some of the steps may be performed in a different sequence or at the same time. It is also well known by those skilled in the art that the embodiments described in the specification are preferred embodiments, in which the involved steps and modules may not be necessary.

Figure 11:
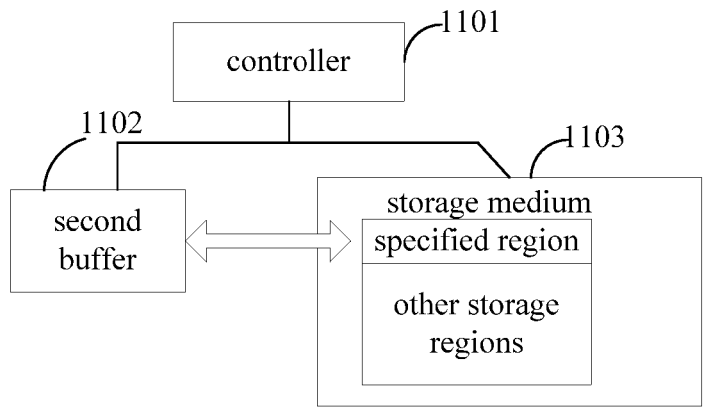
FIG. 11 is a schematic structural diagram of a storage device according to an embodiment of the disclosure.

Corresponding to the above-described method embodiments, a storage device is further provided according to the disclosure. The storage device is connected to an electronic device, the schematic structural diagram of the storage device is illustrated in FIG. 11, and the storage device includes: a controller 1101, a second buffer 1102 and a storage medium 1103, where the storage medium 1103 includes a specified region and other storage regions, and the specified region has different characteristics from the other storage regions.

In this embodiment of the disclosure, the controller 1101 is configured to obtain state information of an electronic device, determine, based on the state information of the electronic device, the status of the electronic device changing to obtain a determination result; and in a case that the determination result indicates that the status of the electronic device changes from a second state to a first state or from the first state to the second state, first data is transferred from the second buffer 1102 to the specified region in the storage medium 1103 or from the specified region in the storage medium 1103 to the second buffer 1102, where power consumption of the electronic device in the first state is less than power consumption of the electronic device in the second state.

The state information indicates a current status of the electronic device. The state information at least includes power parameters of the electronic device. The power parameters indicate the current remaining amount of power of the electronic device. In a case that the remaining amount of power of the electronic device is less than a preset amount of power, the electronic device may supply less power to components, and the electronic device is in a status of low power consumption, that is, the status of the electronic device is in the first state; or in a case that the remaining amount of power of the electronic device is greater than or equal to the preset amount of power, the electronic device may supply more power to components, and the electronic device is in a normal status, that is, the status of the electronic device is in the second state.

In this embodiment of the disclosure, the power parameters of the electronic device may be obtained from a power management system for the electronic device. The power management system records use of the power in the electronic device, and thus the power parameters may be obtained via the power management system. The above-mentioned preset amount of power is a measurement criterion for distinguishing the electronic device being in the status of low power consumption or in the normal status. For example, the preset amount of power may be 20% of the total amount of power. The preset amount of power may be set as required, which is not limited in this embodiment of the disclosure.

Furthermore, the above-mentioned state information may include resource consumption of the electronic device, such as a utilization rate of CPU, and the status of the electronic device is determined based on the utilization rate of CPU, for which the relevant portions in the description for the method embodiments may be referred to.

In this embodiment of the disclosure, the specified region in the storage medium 1103 has different characteristics from other storage regions in the storage medium 1103. As an example, a service life of the specified region is longer than service life of the other storage regions. In a case that the first data is stored in the specified region, a reading/writing operation has less effect on the specified region than the other storage regions, therefore, the service life of the storage medium 1103 is increased in comparison with the service life of the storage medium 1103 in which the first data is stored in the other storage regions. As another example, a speed of reading data in the specified region is higher than a speed of reading data in the other storage regions. In a case that the first data is stored in the specified region, the first data is read faster from the specified region, and thus the speed of reading the first data is increased.

As a matter of course, the characteristics of the specified region being different from the characteristics of the other storage regions may include: a speed of reading data in the specified region being higher than a speed of reading data in the other storage regions, and a service life of the specified region being longer than service life of the other storage regions. In this case, the speed of reading the first data is increased, and the service life of the storage medium 1103 is improved. Hence, in this embodiment of the disclosure, the specified region in the storage medium 1103 to store the first data may be selected according to requirement of the first data.

From the above-described technical solutions, for the storage device according to the embodiment of the disclosure, it may be determined, based on the state information of the electronic device, the status of the electronic device changing to obtain a determination result; and in a case that the obtained determination result indicates that the status of the electronic device changes from the second state to the first state or from the first state to the second state, first data is transferred from the second buffer 1102 to the specified region in the storage medium or from the specified region in the storage medium 1103 to the second buffer 1102, therefore, one storage object is selected based on the status of the electronic device to store the first data.

The specified region in the storage medium 1103 has different characteristics from other storage regions in the storage medium 1103, for example, the service life of the specified region is longer than the service life of the other storage regions. In a case that the first data is stored in the specified region, a reading/writing operation has less effect on the specified region than the other storage regions, therefore, the service life of the storage medium 1103 is increased in comparison with the service life of the storage medium 1103 of which the first data is stored in the other storage regions.

In this embodiment of the disclosure, a practical way of selecting one storage object to store the first data based on the status of the electronic device is as follows. The controller 11 is configured to transfer the first data stored in the second buffer 1102 into the specified region in the storage medium 1103, in a case that the determination result indicates that the status of the electronic device changes from the second state to the first state; the controller 11 is configured to transfer the first data stored in the specified region in the storage medium 1103 into the second buffer 1102, in a case that the determination result indicates that the status of the electronic device changes from the first state to the second state. The controller 1101 is configured to control the second buffer 1102 to be powered off, after the first data stored in the second buffer 1102 is transferred into the specified region in the storage medium 1103.

The first data is stored in the above-described way when the electronic device is in the first state or the second state because of the following reasons. In a case that the determination result indicates that the status of the electronic device changes from the second state to the first state, it is indicated that the power consumption of the electronic device needs to be reduced from a normal consumption to a lower consumption. Hence, in a case that the electronic device is in the first state, power consumption of the second buffer may be reduced by controlling the second buffer to be powered off, and thus the total power consumption of the electronic device may be reduced. In a case that the power consumption of the second buffer is greater than the power consumption of the storage medium, the reduced power consumption by controlling the second buffer to be powered off is greater than the reduced power consumption by controlling the storage medium to be powered off when the electronic device is in the first state. Data stored in a part of the conventional storage media may be lost after the part of the conventional storage media is powered off. Hence, in a case that the status of the electronic device changes from the second state to the first state, the first data stored in the second buffer is transferred into the specified region in the storage medium, to reduce the probability of losing the first data stored in the second buffer after the second buffer is powered off.

Provided that the storage device is used as an SSD module, the controller is used as a controller in the SSD, the second buffer is used as a memory in an SSD module, and the storage medium is used as a flash memory in the SSD module, in a case that both the memory and the flash memory are charged, the power consumption of the memory is greater than the power consumption of the flash memory. Therefore, in a case that the status of the electronic device changes from the second state to the first state, the total power consumption of the electronic device may be reduced by controlling the memory to be powered off. The memory is volatile, which means that the first data stored in the memory will be lost after the memory is powered off. Hence, in a case that the status of the electronic device changes from the second state to the first state, the first data stored in the second buffer is transferred into the specified region in the storage medium, and then the memory is powered off Accordingly, in a case that the status of the electronic device changes from the first state to the second state, the first data stored in the specified region in the flash memory is transferred into the memory. Since the memory directly communicates with the CPU, the speed of reading data may be increased by transferring the first data into the memory when the status of the electronic device is in the second state.

Figure 12:
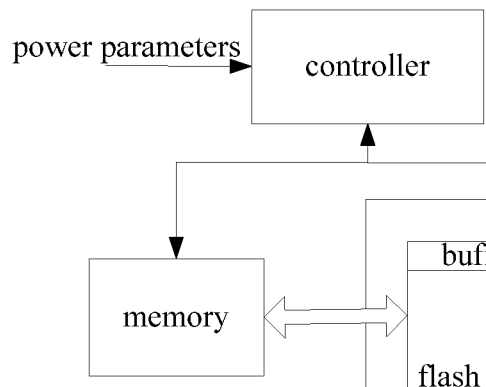
FIG. 12 is a schematic structural diagram of a storage device including power parameters input to a controller according to an embodiment of the disclosure.

Furthermore, the storage medium is used as a flash memory, the flash memory includes multiple flash cells, and one buffer is included in each of the flash cells. A speed of reading data from the buffer to the memory is higher than a speed of reading data from the flash cell to the memory, and a service life of the buffer is longer than service life of the flash cell. Hence, the buffer in the flash memory may be used as a specified region, and the flash cell in the flash memory may be used as another storage region. The schematic structural diagram of the corresponding electronic device is illustrated in FIG. 12. For the electronic device, it may be determined, based on the power parameters, whether the status of the electronic device has changed to obtain a determination result, and one storage object is selected from the memory and the buffer in the flash memory based on the obtained determination result to store the first data.

In the technical solutions according to the disclosure, it may be determined, based on the state information of the electronic device, the status of the electronic device changing to obtain a determination result; and in a case that the obtained determination result indicates that the status of the electronic device changes from the second state to the first state or from the first state to the second state, first data is transferred from the second buffer to the specified region in the storage medium or from the specified region in the storage medium to the second buffer, one storage object to store the first data is selected based on the status of the electronic device.

The specified region in the storage medium has different characteristics from other storage regions in the storage medium, for example, a service life of the specified region is longer than a service life of the other storage regions. In a case that the first data is stored in the specified region, a reading/writing operation has less effect on the specified region than the other storage regions, therefore, the service life of the storage medium is increased in comparison with the service life of the storage medium of which the first data is stored in the other storage regions.

It should be noted that, in the present disclosure, relational terms such as "first" and "second" are used only to distinguish one entity or operation from the other entity or operation, but not necessarily demand or imply that there is actual relation or order among those entities and operations. Furthermore, the terms "including", "containing", or any other variations thereof means a non-exclusive inclusion, so that the process, method, article or device that includes a series of elements includes not only these elements but also other elements that are not explicitly listed, or further includes elements inherent in the process, method, article or device. Moreover, when there is no further limitation, the element defined by the wording "include(s) a . . . " does not exclude the case that, in the process, method, article or device that includes the element, there are other same elements.

The embodiments of the present disclosure are described herein in a progressive manner, with an emphasis placed on explaining the difference between each embodiment and the other embodiments; hence, for the same or similar parts among the embodiments, they can be referred to from one another. For the device disclosed in the embodiments, the corresponding descriptions are relatively simple because the device corresponds to the method disclosed in the embodiments. The relevant portions may be referred to in the description for the method parts.

The above illustration of the disclosed embodiments can enable those skilled in the art to practice or use the disclosure. Multiple changes to these embodiments will be apparent to those skilled in the art, and general principles defined herein may be implemented in other embodiments without departing from the spirit or scope of the disclosure. Hence, the disclosure is not limited to these embodiments disclosed herein, but is to conform to the widest scope consistent with principles and novel features disclosed herein.

The invention claimed is:

1. A data storage method applied to a solid state disk (SSD) comprising a controller, a second buffer and a storage medium, and performed by the controller, comprising:
obtaining target data to be written;
determining a target buffer for storing the target data between a first buffer and a second buffer, wherein the first buffer is a buffer preset in a memory in an electronic device coupled to the SSD, and the second buffer is an inherent buffer in the SSD;
caching the target data into the target buffer,
obtaining state information of the electronic device, wherein the state information indicates a current status of the electronic device and includes a utilization rate of a central processing unit (CPU) of the electronic device;
determining, based on the state information of the electronic device, whether the status of the electronic device has changed, to obtain a determination result; and
transferring first data from the second buffer to a specified region in a storage medium of the SSD, or from the specified region in the storage medium to the second buffer, according to the determination result, wherein the storage medium is a flash memory in the SSD, wherein a speed of reading data in the specified region in the storage medium is higher than a speed of reading data in the other storage regions, and a service life of the specified region in the storage medium is longer than a service life of the other storage regions, wherein the determining the target buffer for storing the target data between the first buffer and the second buffer comprises:

determining a data type of the target data, wherein the data type comprises a first data type and a second data type, wherein an estimated access frequency of data of the first data type is higher than that of data of the second data type; and determining the first buffer to be the target buffer or determining the second buffer to be the target buffer based on the data type of the target data.

2. The method according to claim 1, wherein after the caching the target data into the target buffer, the method further comprises:

counting an access frequency of the target data; and updating the data type of the target data.

3. The method according to claim 2, wherein after it is determined, based on the access frequency of the target data, that the data type of the target data changes, the method further comprises:

transferring the target data into a buffer corresponding to a current target data type, based on the data type of the target data.

4. The method according to claim 1, wherein the first data stored in the second buffer is transferred into the specified region in the storage medium in a case that the determination result indicates that the status of the electronic device changes from a second state to a first state.

5. The method according to claim 4, wherein after the first data stored in the second buffer is transferred into the specified region in the storage medium, the method further comprises: controlling the second buffer to be powered off.

6. The method according to claim 1, wherein the first data stored in the specified region in the storage medium is transferred into the second buffer in a case that the determination result indicates that the status of the electronic device changes from a first state to a second state.

7. A solid state disk, comprising:
a controller; a second buffer; and a storage medium, wherein the controller is configured to:
obtain target data to be written;
determine a target buffer for storing the target data between a first buffer and the second buffer, wherein the first buffer is a buffer preset in a memory in an electronic device coupled to the solid state disk, and the second buffer is a memory in the solid state disk;
cache the target data into the target buffer;
obtain state information of the electronic device, wherein the state information indicates a current status of the electronic device and includes a utilization rate of a central processing unit (CPU) of the electronic device;
determine, based on the state information of the electronic device, whether the status of the electronic device has changed, to obtain a determination result; and
transfer first data from the second buffer to a specified region in the storage medium of the solid state disk, or from the specified region in the storage medium to the second buffer, according to the determination result, wherein the storage medium is a flash memory in the SSD, wherein a speed of reading data in the specified region in the storage medium is higher than a speed of reading data in the other storage regions, and a service life of the specified region in the storage medium is longer than a service life of the other storage regions, wherein the determining the target buffer for storing the target data between the first buffer and the second buffer comprises:

determining a data type of the target data, wherein the data type comprises a first data type and a second data type, wherein an estimated access frequency of data of the first data type is higher than that of data of the second data type; and determining the first buffer to be the target buffer or determining, by the controller, the second buffer to be the target buffer based on the data type of the target data.

8. The solid state disk according to claim 7, wherein the controller is further configured to count an access frequency of the target data after the target data is cached into the target buffer; and update the data type of the target data.

9. The solid state disk according to claim 8, wherein the controller is further configured to transfer the target data into a buffer corresponding to a current target data type, based on the data type of the target data, after it is determined, based on the access frequency of the target data, that the data type of the target data changes.

10. The solid state disk according to claim 7, wherein the controller is configured to transfer the first data stored in the second buffer into the specified region in the storage medium, in a case that the determination result indicates that the status of the electronic device changes from a second state to a first state.

11. The solid state disk according to claim 10, wherein the controller is configured to control the second buffer to be powered off, after the first data stored in the second buffer is transferred into the specified region in the storage medium.

* * * * *